United States Patent [19]
Klimkiewicz et al.

[11] 3,716,070
[45] Feb. 13, 1973

[54] NON-RETURN VALVE DEVICES
[75] Inventors: Bruno Klimkiewicz, 4628 Altlunen; Walter Weirich, Dortmund, both of Germany
[73] Assignee: Gewerkschaft Eisenhutte Westfalia, Wethmar bei Lunen, Westfalia, Germany
[22] Filed: Dec. 31, 1970
[21] Appl. No.: 103,093

[30] Foreign Application Priority Data

March 14, 1970 Germany............P 20 12 297.8

[52] U.S. Cl. ............137/484.2, 137/539.5, 251/24
[51] Int. Cl................................F16k 17/34
[58] Field of Search......137/539, 539.5, 484.2, 484.4, 137/484.6, 538, 543.19; 251/24

[56] References Cited

UNITED STATES PATENTS

| 1,691,449 | 11/1928 | Sharp | 137/543.19 |
| 2,223,699 | 12/1940 | Norgren | 137/484.2 |
| 2,415,258 | 2/1947 | Parker et al. | 137/539.5 |
| 2,714,392 | 8/1955 | Mercier | 137/539.5 |
| 1,022,171 | 4/1912 | Ballard | 137/543.19 X |
| 2,225,880 | 12/1940 | Montelius | 137/484.2 |
| 3,557,826 | 1/1971 | Albrecht | 137/543.19 X |

FOREIGN PATENTS OR APPLICATIONS 632,634  12/1961  Canada.....................137/484.2

Primary Examiner—William F. O'Dea
Assistant Examiner—P. D. Ferguson
Attorney—Sughrue, Rothwell, Mion, Zinn & Macpeak

[57] ABSTRACT

A non-return valve device with a detachable control member having a displaceable valve ball biased by a spring disposed in a blind bore against a seating to close radial cross bores communicating with main outlet passages. The seating has a through bore permitting pressure fluid to pass from an inlet passage to the outlet passages via the cross bores thereby urging the valve ball against the spring force. Relief bores extend from the blind bore to the outlet bores, and are inclined in relation to the axis of the blind bore and the clearance between the exterior of the valve ball and the guiding surface of the member is made sufficiently small so that fluid flow through the cross bores and the outlet passages will established suction in the relief bores to urge the valve ball against the spring force and remove the latter from the fluid flow path.

6 Claims, 1 Drawing Figure

PATENTED FEB 13 1973
3,716,070
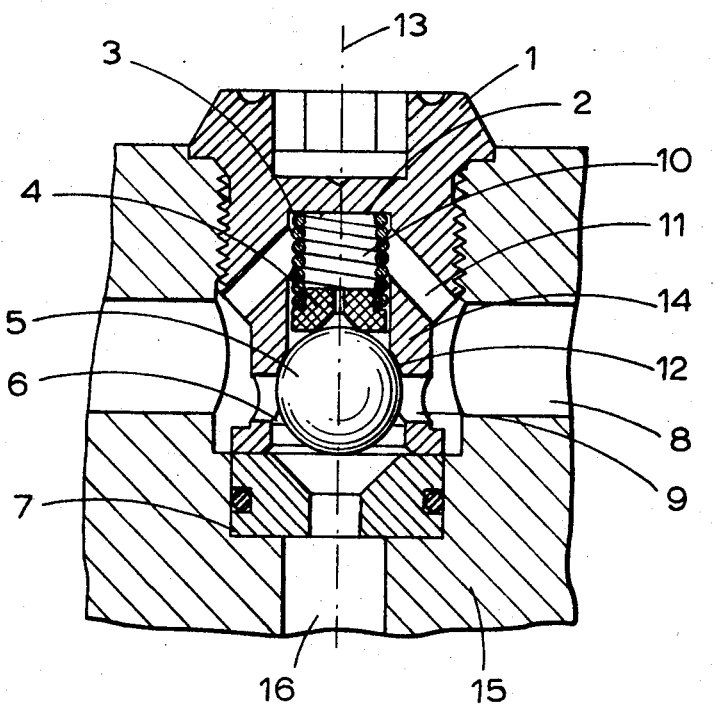
INVENTOR
BRUNO KLIMKIEWICZ
WALTER WEIRICH
BY Sughrue, Rothwell, Mion,
   Zinn & Macpeak
ATTORNEYS

NON-RETURN VALVE DEVICES

BACKGROUND TO THE INVENTION

The present invention relates to a non-return valve device especially, but not solely useful, in mining applications such as roof supporting.

In the known non-return valve devices intended for mine roof supporting systems it is usual to have a valve closure element in the form of a ball which can be lifted from a seating when subjected to pressure fluid in the forward direction. It is common to provide so much play between a wall guiding the movement of the valve closure ball and the ball itself that the pressure fluid can flow around and over the ball. When the non-return valve is subjected to pressure fluid in the opening direction, the ball is lifted away from its seating, and fluid flows from an inlet to an outlet and partially around the ball. The ball therefore always lies at least partially in the fluid flow path and this is quite permissible up to throughflow quantities of 30 liters per minute.

By reason of the progressive automation of pit supporting systems, through-flow quantities of up to 30 liters per minute are no longer found to be adequate and at higher through-flow rates a serious disadvantage arises in the known non-return valve devices since the ball tends to flutter and rotate, and due to this damage can occur after a relatively short time.

SUMMARY OF THE INVENTION

It is a general object of this invention to provide an improved device which will overcome this problem.

It is a further object of this invention to ensure the device of the invention is of constructionally simple form.

In a non-return valve of the type composed of
 a. a housing provided with fluid inlet and outlet passages;
 b. a control member received by said housing and having at least one radial cross bore and a blind bore accommodating a spring engageable with a valve closure element guided for displacement with said member; and
 c. a seating for locating the valve element in sealing relationship with said radial cross bore and for transmitting pressure fluid from the inlet passage to the outlet passage via said radial cross bore.

The invention provides at least one further relief bore establishing communication between the interior of the blind bore and the outlet passage and sufficiently small clearance between the exterior of the valve element and the grinding surface of the member to ensure that a suction is established in said relief bore to urge the valve element against the force of the spring when fluid passes through the outlet passage.

The valve element can be the more usual ball.

The blind bore preferably has a shaped shoulder at its outermost end which serves to limit the displacement of the valve element and a pressure plate may be disposed between the valve element and the spring. It is immaterial whether slight quantities of fluid pass through between the exterior of the valve element and this shoulder and into the blind bore, since the quantities of fluid are immediately sucked away again through the further bore or bores.

According to a further feature of the invention, a plurality of further bores or relief bores are provided. Each relief bore communicates with one outlet passage and preferably has an axis inclined in relation to the axis of the blind bore.

According to another aspect of the invention there is provided a control member for use in a non-return valve device, said member comprising at least one radial cross bore, a blind bore, a spring disposed in said blind bore, a valve element engageable with said spring and guided for displacement in said member to open and close said cross bore, and a further relief bore extending between the interior of the blind bore and the exterior of said member, the axis of said relief bore being inclined to intersect the axis of said radial cross bore, wherein the clearance between the exterior of the valve element and the guiding surface of the member is sufficiently small to ensure that when fluid is flowing outwardly of the radial cross bore a suction can be established in said relief bore to tend to move the valve element against the spring force.

BRIEF DESCRIPTION OF DRAWINGS

The invention will be understood more readily and various other features of the invention will become more apparent from consideration of the following description.

An embodiment of the invention will now be described by way of example only, with reference to the accompanying drawing which is a sectional side elevation of a device made in accordance with the invention.

DESCRIPTION OF PREFERRED EMBODIMENT

As shown in the drawing, the device has a main proprietary housing 15 with a threaded aperture at one end which receives a control member 1. The member 1 is provided with a blind bore 2 having an axis 13 disposed centrally of the housing 15.

The bore 2 accommodates a compression spring 3 in an end chamber 10 and this spring 3 engages on a pressure plate 4 which in turn abuts a valve closure element in the form of a ball 5. Opposite the ball 5 there is disposed a valve seating 7 having a central through-bore. The seating 7 is held within the housing 15 and adapted to locate the ball 5 in sealing relationship with radial cross bores 9 in the member 1.

The wall 14 of the member 1 surrounding the bore 2 is provided with a number of further relief bores 11 extending between interior of the bore 2 and the exterior of the member and having axes inclined in relation to the axis 13.

The housing 15 is provided with a passage 16 disposed opposite the member and this passage 16 serves as the inlet to the device. Similarly the housing 15 is also provided with cross bores 8 extending perpendicularly to the axis 13. These bores 8 serve as the outlets from the device.

The radial cross bores 9 of the member 1 extend perpendicularly to the axis 13 and generally allow communication between the bores 16 and 8 in the direction of pressure fluid-flow. The end of the bore 2 remote from the spring 7 has a shoulder which is shaped at a position 12 to accommodate the ball 5 when the latter is displaced inwardly of the bore 2. In accordance with the invention there is only a very slight clearance between the exterior of the ball 5 and the facing wall 6 of the member 1 so that the ball 5 can be likened to a piston.

The operation of the device is as follows:

On entry of fluid through the passage 16 the ball 5 is lifted away from the seating 7 by the fluid pressure to open the bores 9. The fluid then flows through at least one of the bores 9 into the associated one of the outlet bores 8 and thence to a consumer system for example to a hydraulic pit prop of a mine rod support system. Since the valve ball 5 has only a very slight play relative to the wall 6 of the member 1, suction occurs in the associated bore 11 when fluid flows away through one of the bores 8. This suction tends to displace the valve ball 5 further into the bore 2 against the force of the spring 3 until the ball 5 abuts the shoulder 12. In this particular example the shoulder 12 is so arranged that when the ball 5 is in engagement therewith, the ball 5 still lies partially in the fluid flow path. However, it is also possible to arrange that when engaged with the shoulder 12, the ball 5 is completely out of the fluid flow path.

It is of particular advantage that the device made in accordance with the present invention, achieves operational reliability with a very simple style of construction. Moreover, in the mining application, the control member can be used separately in known main housings without modification to components of the mine roof support systems.

We claim:

1. In a non-return valve including a housing provided with a fluid inlet passage and a fluid outlet passage, a valve control member positioned within the housing and having a radial cross bore and a blind bore, a valve closure element positioned for displacement within a guiding surface of the control member, spring biasing means accommodated within the blind bore and engageable with the valve closure element, and seating means within the housing for seating the valve element in sealing relationship with the radial cross bore when the valve is closed and for enabling the flow of pressurized fluid from the inlet passage to the outlet passage via the radial cross bore when the valve is open, the improvements comprising:

a. at least one suction relief bore extending between the interior of the blind bore and the outlet passage, and
   b. a relatively small dimensional clearance between the valve closure element and the guiding surface of the control member, whereby an eductive suction is established within the relief bore by the flow of fluid through the outlet passage when the valve is open, to urge the valve closure element against the force of the spring biasing means, thereby tending to firmly retain the valve closure element in an open position and prevent chattering.

2. A valve according to claim 1, wherein the blind bore has a shaped shoulder at its outermost end which serves to limit the displacement of the valve closure element.

3. A valve according to claim 1, wherein a pressure plate is interposed between the valve closure element and the spring biasing means.

4. A valve according to claim 8, wherein a plurality of suction relief bores and outlet passages are provided, each suction relief bore communicating with one outlet passage.

5. A valve according to claim 4, wherein the axis of each suction relief bore is inclined relative to the axis of the blind bore.

6. A valve according to claim 1, wherein the axis of the outlet passage extends perpendicular relative to the axis of the inlet passage.

* * * * *